(12) United States Patent
Zebuhr (10) Patent No.: US 6,261,419 B1
(45) Date of Patent: Jul. 17, 2001

(54) ROTATING PLATE HEAT EXCHANGER

(75) Inventor: William H. Zebuhr, Nashua, NH (US)

(73) Assignee: Ovation Products Corporation, Nashua, NH (US)

( * ) Notice: Subject to any disclaimer, the term of this patent is extended or adjusted under 35 U.S.C. 154(b) by 0 days.

(21) Appl. No.: 09/246,354

(22) Filed: Feb. 8, 1999

(51) Int. Cl.$^7$ .............................. B01D 3/02; B01D 1/22; B01D 1/26
(52) U.S. Cl. ..................... 202/172; 159/6.1; 159/18; 165/88; 203/24
(58) Field of Search ........................ 159/6.1, 18, 28.6, 159/24.1, 27.3; 165/88, 165, 166; 202/238, 172, 173, 174, 182; 203/24, 26

(56) References Cited

U.S. PATENT DOCUMENTS

| | | | |
|---|---|---|---|
| 2,703,310 | 3/1955 | Kretchmar | 202/205 |
| 2,894,879 | 7/1959 | Hickman | 202/45 |
| 2,899,366 | 8/1959 | Hickman | 202/205 |
| 3,764,483 | 10/1973 | Tleimat | 202/236 |
| 3,890,205 | 6/1975 | Schnitzer | 202/236 |
| 4,125,946 | 11/1978 | Prager | 34/80 |
| 4,129,014 | 12/1978 | Chubb | 62/333 |
| 4,235,679 | 11/1980 | Swaidan | 202/234 |
| 4,267,021 | 5/1981 | Speros et al. | 202/176 |
| 4,402,793 | 9/1983 | Petrek et al. | 202/174 |
| 4,504,361 | 3/1985 | Tkac et al. | 202/172 |
| 4,585,523 | 4/1986 | Giddings | 202/236 |
| 4,586,985 | 5/1986 | Ciocca et al. | 202/174 |
| 4,671,856 * | 6/1987 | Sears | 203/22 |
| 4,707,220 | 11/1987 | Feres | 159/6.1 |
| 4,731,159 * | 3/1988 | Porter et al. | 159/6.1 |
| 5,045,155 | 9/1991 | Ramsland | 202/174 |
| 5,409,576 * | 4/1995 | Tleimat | 202/174 |
| 5,411,640 | 5/1995 | Ramsland | 202/174 |
| 5,628,879 | 5/1997 | Woodruff | 202/234 |
| 5,810,975 | 9/1998 | Bourdel et al. | 202/176 |

FOREIGN PATENT DOCUMENTS 757085   9/1956   (GB) .

* cited by examiner

*Primary Examiner*—Shrive Beck
*Assistant Examiner*—Frederick Varcoe
(74) *Attorney, Agent, or Firm*—Cesari and McKenna, LLP (57) ABSTRACT

The invention relates to an improved evaporator and condenser unit for use in distilling a liquid such as water. The evaporator and condenser unit includes a plurality of stacked, spaced-apart plates disposed within a housing. The plates are horizontally arranged around a common, vertical axis for rotation. Adjacent plates define spaces between their oppositely facing surfaces, which are alternating configured as evaporating and condensing chambers. An outlet tube transfers vapor generated within the housing to a compressor and an inlet tube delivers compressed vapor to the condensing chambers. A sump containing the liquid to be distilled is located at a lower portion of the housing. A rotating element extends into the sump and forces liquid to be distilled up a stationary feed pipe where it is discharged into the evaporating chambers which are open at both their inner and outer ends. Each plate further includes at least one port for distributing compressed vapor to and extracting condensate from the condensing chambers which are sealed at both their inner and outer ends. The ports cooperate to form a generally vertical fluid flow path through each condensing chamber, by-passing the adjacent evaporating chambers. A stationary scoop tube removes condensate generated within the condensing chambers.

26 Claims, 9 Drawing Sheets

ROTATING PLATE HEAT EXCHANGER

CROSS-RELATED APPLICATIONS

This application is related to the following co-pending U.S. Patent Application:

U.S. patent application Ser. No. 09/211,363 entitled, IMPROVED ROTATING PLATE HEAT EXCHANGER, filed Dec. 14, 1998, and assigned to the assignee of the present application.

BACKGROUND OF THE INVENTION

This invention relates to distillation systems and, more specifically, to an improved, highly efficient, rotary evaporator and condenser for use in a vapor compression distiller.

Distillation is a common method for generating potable water from otherwise unsafe water sources (such as sea water or polluted ground water). With distillation, water is heated to boiling, and the resultant vapor (i.e., steam) is collected and condensed, producing distilled water. Many contaminants that are present in the water source are left behind when the water is converted to its vapor phase. Conventional small distillers typically incorporate an electric heating element to boil water in a tank. A condensing coil mounted above the tank collects the vapor and condenses it. The distilled water is then transferred to a holding tank or cell. These boiler-type distillers, however, require substantial amounts of electrical power to produce relatively little distilled water and are thus highly inefficient. They are also extremely slow, often taking many hours to produce just a few gallons of distilled water. Accordingly, boiling-type distillers have not gained widespread acceptance or use.

In addition to boiler-type distillers, thin-film distillers have also been proposed. For example, U.S. Pat. No. 4,402,793 to Petrek et al. titled MULTIPLE EFFECT THIN FILM DISTILLATION SYSTEM AND PROCESS is directed to a solar-powered, thin film distiller. In the distiller of the '793 patent, a plurality of parallel, spaced-apart plates are arranged to face the sun. Water to be distilled is supplied to the tops of the plates and guided to run down the back face of each plate. Sunlight irradiating the first plate's front side heats the plate and causes a portion of the water running down the opposite side to evaporate. The vapor condenses along the front side of the next adjacent plate, transferring heat to the flow of water on its opposite side and so on. Condensate generated along the front sides of the plates is separately collected at the bottoms of the plates.

To improve the efficiency of thin-film distillers, rotary evaporators have also been designed. For example, U.S. Pat. No. 4,731,159 to Porter et al., entitled EVAPORATOR, is directed to a rotary type evaporator having a plurality of horizontally stacked annular plates that are disposed within a housing and mounted for rotation about a central shaft. The ends of alternating pairs of plates are sealed to define sealed spaces. Each sealed space includes two inner plate surfaces facing each other and two outer surfaces, each of which is opposite a respective inner surface. The sealed spaces, moreover, are interconnected by a series of orifices and washers disposed between adjacent outer plate surfaces. A liquid to be distilled is introduced into the stack of rotating annular plates and enters each of the sealed spaces through an inlet port. As the liquid enters the spaces, it flows along the opposing inner surfaces of the space. A condensable vapor is introduced into the housing and is thus free to flow around the outer surfaces of the plates. The vapor is not, however, able to enter the sealed spaces. Since the liquid in the sealed spaces is at a lower temperature than the vapor, the vapor condenses along the outer surfaces of the plates. The condensate is thrown off of the rotating plates, collects inside the housing and is removed through an outlet port located in the bottom of the housing. Condensation of the vapor also transfers heat across the plates to the liquid, thereby causing a portion of the liquid in the sealed spaces to evaporate. The vapor exits the sealed spaces through the liquid inlet ports and is removed from the top of the housing. Any non-evaporated liquid remaining in the spaces flows upwardly along the sealed spaces through the corresponding orifice/washer arrangements and is also withdrawn from the top of the evaporator.

Although it may provide some advantages, the design of the '159 evaporator presents a substantial risk of contamination of the condensate by the liquid being evaporated and is thus not suitable to generating potable distilled water. In other words, with the evaporator of the '159 patent, the unsafe water which is being distilled is capable of mixing with and thus contaminating the distillate. For example, a leak at any of the sealed spaces would allow liquid from the sealed space to enter the housing and mix with the distillate being collected therein. The likelihood of such an occurrence, moreover, is not insignificant due to the corrosive attributes of some water sources and the high number of orifices and washers required to provide fluid communication between the various sealed spaces of the evaporator of the '159 patent.

It is also known to provide those plate surfaces on which liquid is evaporated with some type of hydrophilic treatment. That is, these plate surfaces are ideally treated to have a strong affinity for the liquid being evaporated, thereby causing the liquid to adhere to the entire plate surface (rather than simply forming narrow streams). Numerous techniques are known to provide hydrophilic properties to thin metal plates. The '159 patent, for example, notes that its plates may be chemically etched or sand-blasted. In addition, simply allowing copper plates to oxidize provides some hydrophilic effects. Other techniques include applying organic films to the plate surfaces. With most of these techniques, the plates are treated individually and then assembled together to form the distiller. During the assembly process, however, the hydrophilic treatment degrades, often substantially, due to the high temperatures required to assembly the treated plates. For example, conventional soldering and braising techniques generate temperatures on the order of 450° F.

Multiple-effect distillation systems are also known. U.S. Pat. No. 2,894,879 to Hickman, entitled MULTIPLE EFFECT DISTILLATION, discloses a distiller having fifteen vertically arranged effects. Each effect includes a rotating evaporator section and an associated condenser section. The liquid to be distilled is supplied to the evaporator section of the first stage, which is located at the top of the distiller. A heat source, such as steam, is similarly provided to the condenser section of the first effect, in order to evaporate at least a portion of the liquid. The vapor generated in the evaporator section of the first effect is then transferred to the second effect condenser section where it is used to heat liquid left over from the first effect that is likewise provided to the evaporator section of the second effect. The distillate generated within the condenser section of the first effect is also transferred to the condenser section of the second effect. This process is repeated at each effect of the distiller. The distillate accumulated from each of the effects is then removed from the system. To achieve the desired flow among the effects, the distiller of the '879 patent includes numerous rotating tubing segments that are used to interconnect the various evaporator and condenser sections and to spray liquid onto the surface of the evaporator sections. Accordingly, the manufacturing and assembly costs of the system are relatively high. Furthermore, any leaks of liquid in the evaporator sections will contaminate distillate being collected in the adjacent condenser sections. The existence of any such leaks, moreover, would be extremely difficult to detect.

Vapor compression distillers, which can be more efficient than conventional distillers, are also known. The underlying principle of vapor compression distillers is that, by raising the pressure of a vapor (e.g., steam), its saturation temperature also rises. In the vapor compression distiller, vapor produced in an evaporator is removed, compressed (raising its saturation temperature) and returned to the evaporator, where it condenses, producing a distillate. Furthermore, the heat of vaporization that is given off as the vapor (having a raised saturation temperature) condenses is used to heat (and thus evaporate) the liquid being distilled. Large-scale vapor compression distillers using powerful centrifugal compressors can produce hundreds of gallons of distilled water a day. These distillers, however, do not scale well, as the operating costs associated with the centrifugal compressor make them impractical for installations that require only tens of gallons of distilled water a day.

SUMMARY OF THE INVENTION

It is an object of the present invention to provide a rotary evaporator and condenser for use in a distiller.

It is a further object of the present invention to provide an evaporator and condenser that reduces the risk of contamination of the final condensate.

Another object of the present invention is to provide an evaporator and condenser that may be easily manufactured.

A further object of the present invention is to provide an evaporator and condenser that retains its hydrophilic properties following assembly.

A still further object of the present invention is to provide a multiple-effect evaporator and condenser unit.

Briefly, the invention relates to an improved evaporator and condenser unit for use in distilling a liquid such as water. The evaporator and condenser unit includes a plurality of stacked, spaced-apart heat-exchange plates disposed within a housing. The plates are horizontally arranged around a common, vertical axis for rotation. Adjacent plates define spaces between their oppositely facing surfaces, and the spaces are alternatingly configured as evaporating and condensing chambers. The evaporating chambers, moreover, are open at both their inner and outer diameter ends, while the condensing chambers are sealed at both their inner and outer diameter ends. Each plate includes at least one port for distributing compressed vapor to and extracting condensate from the condensing chambers. In particular, each plate includes at least one port preferably disposed at an outer diameter position. The ports cooperate to provide a generally vertical fluid flow path through each condensing chamber, by-passing the evaporating chambers, by which compressed vapor is fed to the condensing chambers and the resultant condensate withdrawn. The condensate is thus drawn from a chamber having a higher pressure than the adjacent evaporating chambers containing the liquid to be distilled, reducing the risk of contamination of the condensate. An outlet tube transfers vapor generated within the housing to a compressor and an inlet tube delivers compressed vapor to the fluid flow path of the condensing chambers. A sump containing the liquid to be distilled is located at a lower portion of the housing and a rotating element extends from the plate stack into the sump. A first stationary scoop tube also extends into the sump proximate to the rotating element and is coupled to a feed pipe that extends along the inner diameter ends of the plate stack. The feed pipe includes a slot facing the open inner diameter ends of the evaporating chambers. A second stationary scoop tube extends into a condensate collection area at the upper most condensing chamber to remove condensate generated within the evaporator and condenser unit.

In operation, the stack of plates are rotated, causing the rotating element to generate a rotating annular pool of liquid which is forced into the first stationary scoop tube and up the feed pipe. The liquid is discharged from the slot in the feed pipe and enters the rotating evaporating chambers at their open inner diameter ends. As liquid contacts each evaporating chamber, it is accelerated and forced outwardly due to the centrifugal forces generated by the rotating plates. This acceleration of the liquid helps keep the liquid flowing in sheet form along the oppositely facing surfaces of each evaporating chamber. As it flows along the plate surfaces, a portion of the liquid evaporates and the vapor flows through the open evaporating chambers and enters the housing. The vapor is drawn out of the housing through the outlet tube and into the compressor. Any remaining liquid in the evaporating chambers is flung off of the corresponding plate surfaces, strikes the side walls of the housing and drops down into the sump. Compressed vapor is delivered by the inlet tube to the fluid flow path formed along the stack of plates, thereby supplying compressed vapor to each condensing chamber. Compressed vapor condenses along the oppositely facing surfaces of the each condensing chamber and the condensate is forced to the outer ends of the condensing chambers, which are sealed. The condensate from each condensing chamber flows upwardly through the stack of plates along the fluid flow path and is withdrawn from the housing by the second stationary scoop tube.

In an alternative embodiment, the evaporator and condenser unit provides multiple condensing and evaporating effects. More specifically, a plurality of evaporator/condenser effects are preferably arranged in vertical stack. Each effect includes a plurality of stacked, spaced-apart heat-exchange plates such that adjacent plates define spaces between their oppositely facing surfaces and the spaces are alternatingly configured as evaporating and condensing chambers. The inner and outer diameter ends of the evaporating chambers are both open, while the inner and outer diameter ends of the condensing chambers are both sealed. An outlet tube transfers vapor generated by the highest order effect to a compressor, where it is compressed and returned to the first effect. A sump containing the liquid to be distilled is located at a lower portion of the housing. Each of the plates within a single effect includes at least one port disposed at an outer radial position that provides a generally vertical fluid flow path through each condensing chamber. A first stationary scoop tube extends into the sump proximate to a rotating element. The first scoop tube is coupled to a feed pipe that extends along the inner ends of the plate stack and includes a slot facing the open inner ends of the evaporating chambers. A second stationary scoop tube extends into a condensate collection area proximate to the first effect to remove condensate generated at each effect. Disposed between each effect is one or more transfer plates that includes a vapor trap and at least one port. The port of the transfer plates is radially aligned but axially off-set from the respective ports of the adjacent effects. In particular, the port of the transfer plates is disposed further outboard than the respective ports of the adjacent effects. The multiple-effect unit also includes an outer wall that is disposed between the outer ends of the plates and the housing side walls along all but the highest order effect and an inner wall that is disposed between the inner ends of the plates and the axis of rotation along all but the highest order effect. At least one aperture is formed through the outer wall at each effect.

In operation, the flow of liquid, vapor, compressed vapor and condensate within each effect is generally the same as described above in connection with the single effect system. For example, rotation of the plates causes the first stationary scoop tube to draw liquid upwardly from the sump and into the feed pipe where it is discharged into the evaporating chambers of each effect. Within the evaporating chambers, liquid flows along the opposing plate surfaces and a portion thereof evaporates. Excess liquid from the evaporating chambers of all but the highest order effect, rather than entering the housing, instead collects inside of the outer wall where it forms an annular pool. A stream of liquid from the annular pool flows through the apertures, enters the housing and collects at the sump. The presence of this annular pool blocks the vapor generated in the evaporating chambers from also flowing through the apertures and entering the housing. Compressed vapor is delivered to the first effect and the condensate generated within each effect flows upwardly along the fluid flow path. Instead, vapor flows to the transfer plate at the boundary to the next higher order effect. At the transfer plate, vapor flows through the open portion of the port and into the condensing chambers of the next effect. The off-set ports at each transfer plate allow condensate from each effect to be conveyed through each effect, while blocking the vapor generated within a given effect from simply flowing to the condensing chambers of that effect. At the highest order effect, the vapor generated in the corresponding evaporating chambers simply enters the housing and is transferred to the compressor. Any un-evaporated liquid returns to the sump. At the first effect, the condensate generated by each effect is withdrawn by the second stationary scoop tube.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
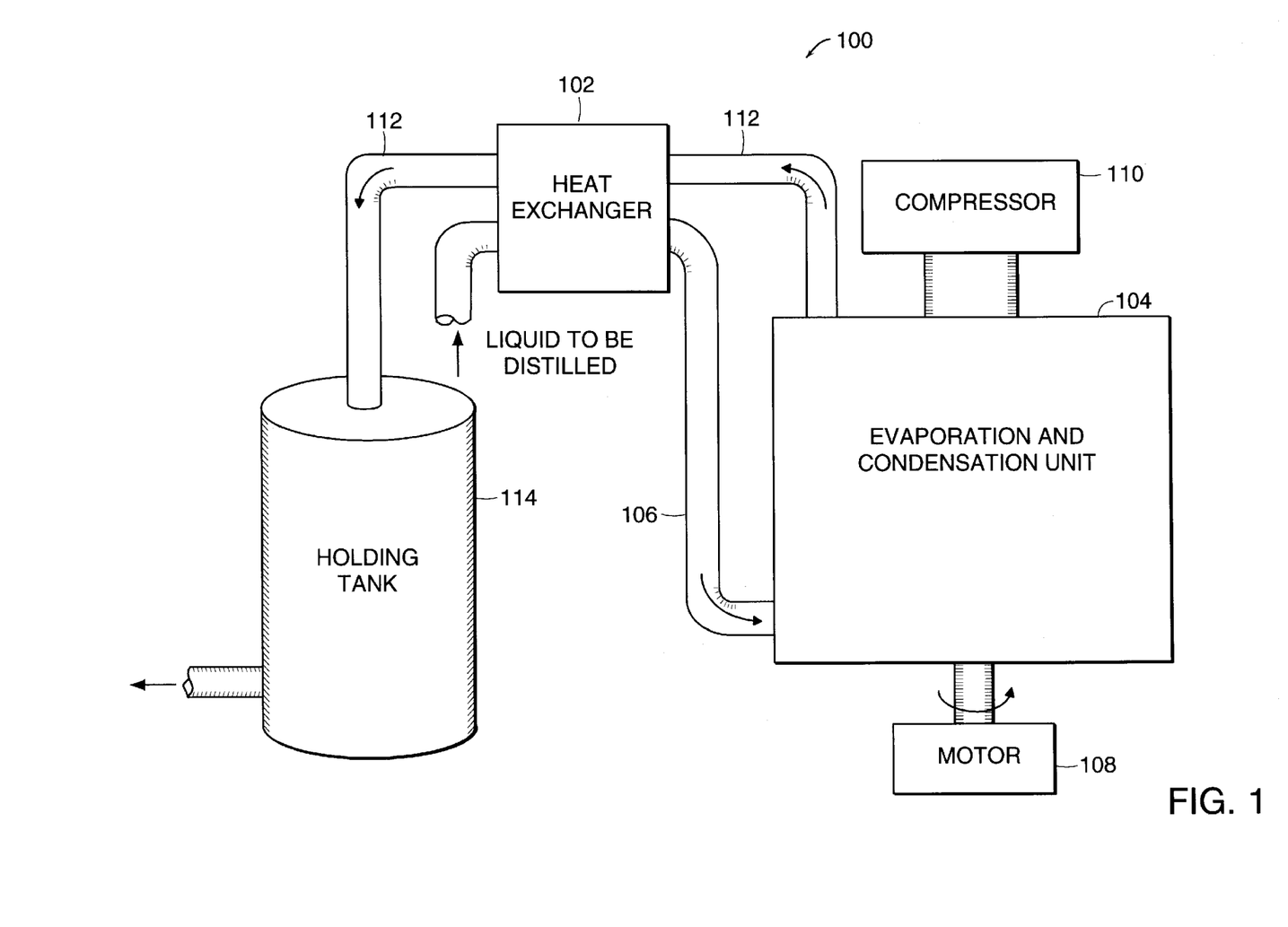
FIG. 1 is a highly schematic block diagram of a vapor compression distiller in accordance with the present invention.

FIG. 1 is a schematic diagram of a vapor compression distillation system 100 in accordance with the present invention. Generally, the system 100 comprises a heat exchanger, such as counter-flow heat exchanger 102, for heating a supply of liquid to be distilled, such as non-potable water. Heated liquid is transferred to an evaporation and condensation unit 104 by a feed line 106. Coupled to the evaporation and condensation unit 104 are a motor 108 for supplying rotary power and a compressor 110, which receives vapor generated within unit 104, compresses it and returns it to unit 104. An output line 112 transfers a condensate, such as distilled water, to a holding tank 114.

Single Effect System

Figure 2:
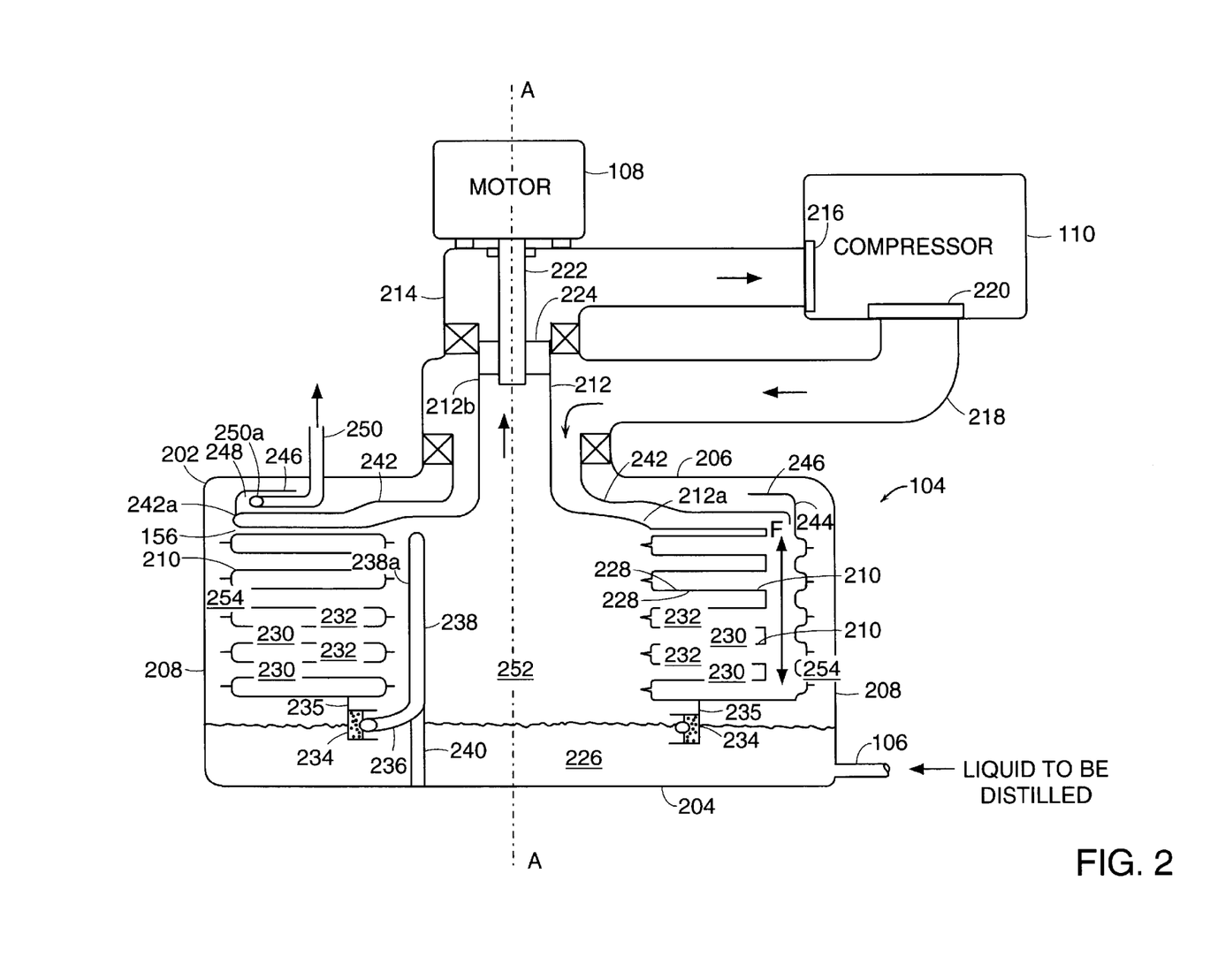
FIG. 2 is a cross-sectional plan view of a single-effect, rotary heat exchanger in accordance with the present invention.

FIG. 2 is a highly schematic, cross-sectional view the evaporation and condensation unit 104 of FIG. 1 configured as a single effect system. The unit 104 includes a housing 202 having a bottom wall 204, a top wall 206 and side walls 208. Disposed within the housing 202 are a plurality of horizontally stacked heat-exchange plates 210 aligned for rotation about a common, central axis A—A. Mounted at the upper portion of the plate stack and extending through the top wall 206 of the housing 202 is a channel 212 having a flange segment 212a and a tube segment 212b. A vapor outlet tube 214 couples the tube segment 212b of the channel 212 to an inlet port 216 of the compressor 110. A vapor inlet tube 218 connects the housing 202 preferably at its top wall 206 to an outlet port 220 of the compressor 110. A shaft 222 from motor 108 extends through the outlet tube 214 and engages the channel 212 through a rotary drive adapter 224. The rotary drive adapter 224 permits fluid communication between the channel 212 and the outlet tube 214. A sump 226 which receives a liquid to be distilled from feed line 106 is located at the bottom of the housing 202.

It should be understood that motor 108 and/or compressor 110 may be located below housing 202 or at other convenient locations.

Figure 3A:
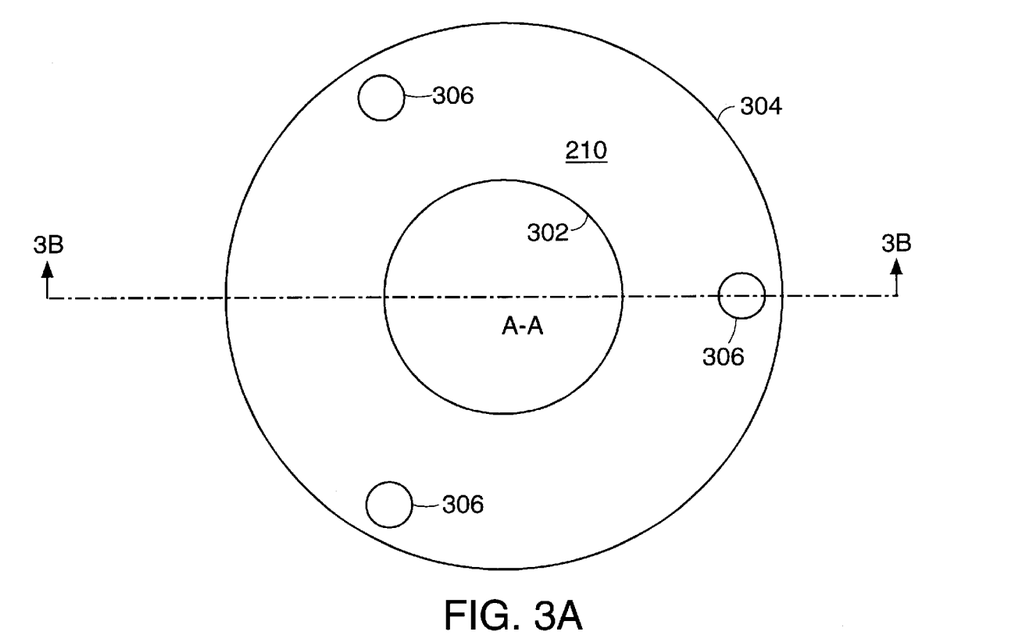
FIG. 3A is a top view of a heat-exchange plate.
Figure 3B:
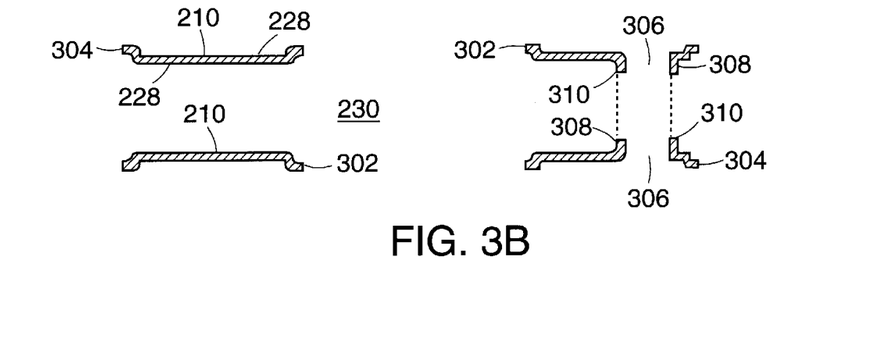
FIG. 3B is a side view of a pair of heat-exchange plates along lines 3B—3B of FIG. 3A.

Each plate 210 defines two plate surfaces 228, and the oppositely facing surfaces 228 of adjacent plates 210 define spaces therebetween. These spaces, moreover, are alternately configured as evaporating chambers 230 and condensing chambers 232. FIG. 3A is a top view of a preferred heat-exchange plate 210. FIG. 3B is a side view of a pair of plates (which have been spaced apart for clarity) along lines 3B—3B of FIG. 3A. Each plate 210 includes both an inner diameter edge 302 and an outer diameter edge 304 relative to axis of rotation A—A. Each plate 210 also includes one or more ports 306 for distributing compressed vapor and for extracting a condensate from the unit 104, as described below. Ports 306 are preferably disposed proximate to outer diameter edge 304. In the preferred embodiment, each plate 310 includes three ports 306. Extending from one plate surface 228 of each plate 210 is a port flange 308 that surrounds the corresponding port 306. Each port flange 308 includes a distal surface 310.

When stacked in a vertical arrangement, plates 210 (FIG. 2) establish a generally vertical fluid flow path, designated by arrow F, along ports 306. This flow path provides fluid communication with each condensing chamber 232, but by-passes the adjacent evaporating chambers 230. Extending into sump 226 from the plate stack is a rotating element 234. Rotating element 234, which may be a U-shaped bracket having two side walls that are generally parallel to the surface of the liquid in the sump 226, extends from the lowest plate 210 in the stack into the sump 226 by means of a perforated support arm 235. A first stationary scoop tube 236 having a scoop end 236a also extends into the sump 226. In particular, the scoop end 236a is disposed in the well defined by the side walls of the U-shaped rotating element 234. The first stationary scoop tube 236 is coupled to a stationary liquid feed pipe 238 which extends up through the stack of plates 210 adjacent their inner diameter ends 302. Scoop tube 236 and/or feed pipe 238 may be mounted to the bottom wall 204 of housing 202 by mounting bracket 240. Running along the length of the feed pipe 238 is a slot 238a that faces the inner diameter ends 302 of the adjacent plates 210. Slot 238a may be continuous or intermittent and feed pipe 238 is preferably closed at its end opposite scoop tube 236.

Mounted to the stack of plates 210 opposite the sump 226 is a top plate 242 having a condensate port 244 that is in fluid communication with the fluid flow path through the condensing chambers 232. A flange 246 is preferably mounted to an outer edge 242a of top plate 242 opposite to the stack of plates 210 so as to define a collection space 248 between flange 246 and top plate 242 opposite the stack of plates 210. A second stationary scoop tube 250 having a scoop end 250a extends through the top wall 206 of housing 202 such that scoop end 250a is disposed in the collection space 248. The passageway defined between flange segment 212a and top plate 242 cooperate with the condensing chambers 232 through flow path F to form an enclosed condensing space. The stack of plates 210 within housing 202 also defines an inner vapor collection space 252 inboard of the inner diameter edges 302 of plates 210 and an outer vapor collection space 254 between the outer edges 304 of plates 210 and the side walls 208 of the housing 202. The inner vapor space 252, outer vapor space 254 and evaporating chambers 230 combine to form a evaporation space that is separate from the condensate space. In addition, the flange segment 212a of channel 212 preferably cooperates with top plate 242 to provide a first fluid (e.g., vapor) communication path 256 between the outer and inner vapor collection spaces 254, 252. A second fluid communication path exists between spaces 254, 252 through perforated support arm 235.

Suitable heat-exchange plates are described in U.S. patent application Ser. No. 09/211,363, which is hereby incorporated by reference in its entirety. Adjacent plates 210 forming each condensing chamber 232, moreover, are sealed at both their inner and outer diameter edges 302, 304, while adjacent plates 210 forming each evaporating chamber 232 are open at their inner and outer diameter edges 302, 304.

In the preferred embodiment, the stack of plates 210 is assembled in pairs. That is, a pair of heat-exchange plates 210 are joined at their inner and outer diameter ends 302, 304 through conventional techniques, such as soldering, welding or braising, to define an enclosed condensing chamber 232. The exterior surfaces 228 of each pair of joined plates 210 (which will ultimately form the adjacent evaporating chambers 230) may then be subjected to some type of hydrophilic treatment. For example, a hydrocarbon coating may be applied to the exterior surfaces 228 utilizing plasma deposition techniques. Suitable coatings may be obtained from Advanced Surface Technology, Inc. of Billerica, Mass. Once the plate surfaces 228 that are to form the evaporating chambers 230 have been treated, adjacent pairs of plates 210 may be joined together. In particular, the two distal surfaces 310 of facing port flanges 308 are welded, braised, soldered or otherwise joined together using suitable techniques. Since the welding, braising and/or soldering only takes place locally around the distal surfaces 310 of port flanges 308, plates 210 are not subject to extensive thermal stresses. In the preferred embodiment, low temperature (e.g., 280° F.) soldering techniques are utilized. Accordingly, the evaporation chambers 230 of the present invention retain their hydrophilic properties following assembly of the plate stack, unlike more conventional plate assemblies.

It should be understood that other methods such as adhesives, interfitting relationships, etc. may be used to join the heat-exchange plates 210.

Figure 4:
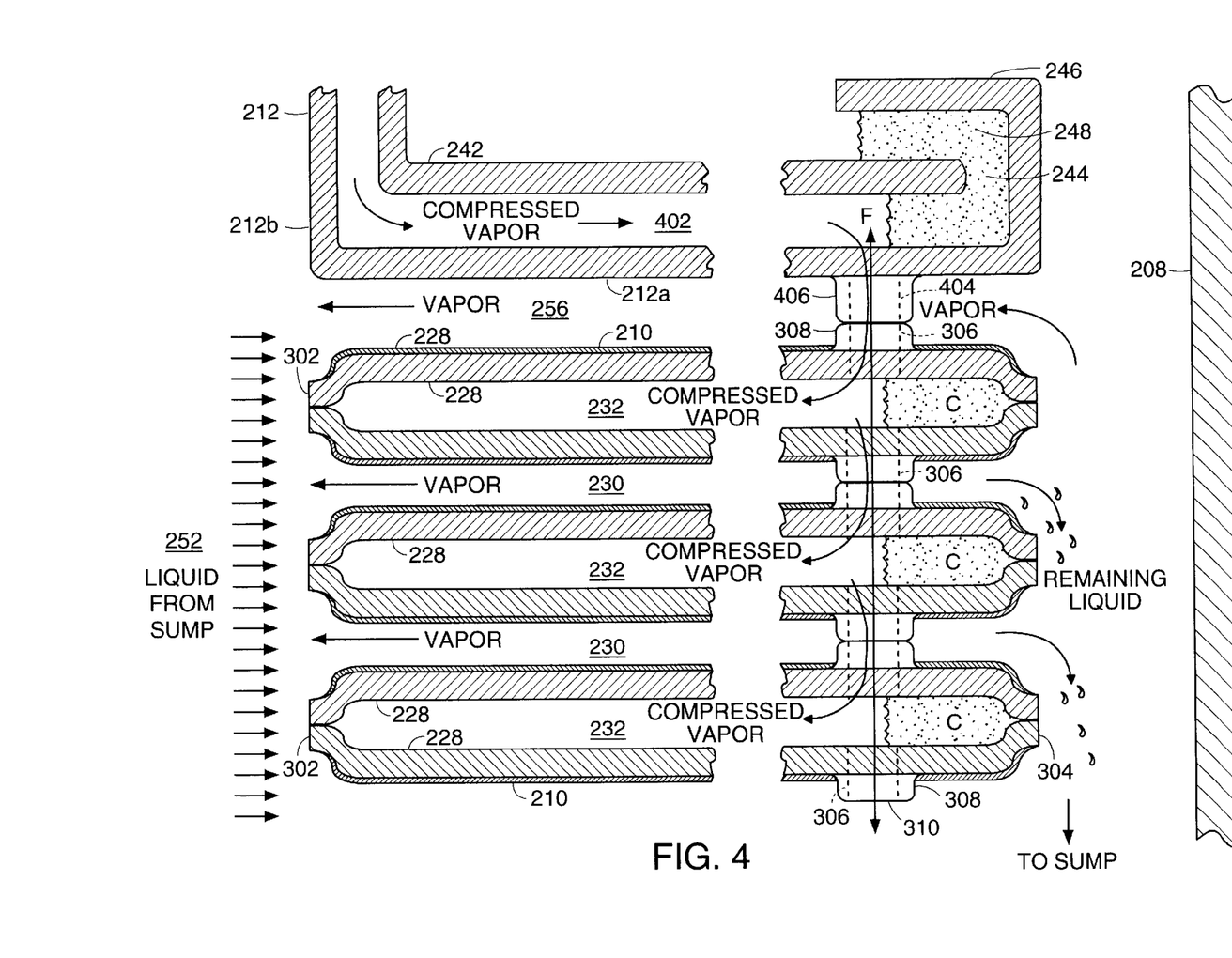
FIG. 4 is partial cross-sectional view of a series of plates the heat exchanger of FIG. 2.

FIG. 4 is an enlarged cross-sectional view of several stacked plates 210 illustrating the corresponding fluid flow patterns during operation of the evaporation and condensation unit 104. Rotation of the stack of plates 210 causes an annular pool of liquid to form in the well of the U-shaped rotating element 234. Liquid from this pool is forced into the first stationary scoop tube 236 and driven up through the feed pipe 238, where it is discharged through the slot 238a. That is, rotating element 234 and scoop tube 236 combine to form a type of pump. This liquid impinges against the rotating stack of plates 210. Since the evaporating chambers 230 are open at their inboard ends, liquid enters the evaporating chambers 230 and, due to the rotation of plates 210 and the hydrophilic treatment, is converted into sheets (as opposed to discrete streams) that flow along each of the oppositely facing plate surfaces 228 within the respective evaporating chamber 230. With the inboard ends of the condensing chambers 232 sealed, as described above, sump liquid from feed pipe 238 cannot enter the condensing chambers 232.

Those skilled in the art will recognize that other arrangements may be made to deliver liquid from the sump 226 to the evaporating chambers 230, including conventional pumps.

As described below, heat from the adjacent condensing chambers 232 causes some portion of liquid flowing along the plate surfaces 228 in the evaporating chambers 230 to evaporate and form a vapor. Since the evaporating chambers 230 are open at both their inboard and outboard ends, this vapor may flow to both the inner vapor collection space 252 and the outer vapor collection space 254. Any remaining liquid that is not converted to vapor is flung off of the plate surfaces 228, strikes the stationary side walls 208 of the housing 202 and drops back down into the sump 226.

Operation of the compressor 110 draws vapor from the inner vapor collection space 252 upwardly through the housing 202 and into the vapor outlet tube 214. In particular, the vapor is drawn through the tube segment 212b of channel 212. Vapor in the outer vapor collection space 254 may also be drawn into the vapor outlet tube 214 through the fluid communication path 256 that is formed by flange segment 212a and/or the perforations of support arm 235. At the compressor 110, the vapor is compressed, thereby raising its temperature and pressure. The compressed vapor is returned to the housing 202 by vapor inlet tube 218. Preferably, the compressed vapor flows along a passageway 402 (FIG. 4) formed between top plate 242 and flange segment 212a. The compressed vapor then flows through a port 404 formed in flange segment 212a. Port 404 is preferably aligned and in fluid communication with ports 306 of the stack of plates 210. A port flange 406 may similarly extend around port 404 and join the port flange 308 of the next adjacent plate 210.

Compressed vapor travels along the fluid flow path F and enters each condensing chamber 232 through the respective ports 306 formed in the plates 210. Because the liquid flowing along plate surfaces 228 in the adjacent evaporating chambers 230 is at a lower temperature (e.g., 212° F.) than the compressed vapor (e.g., 214° F. saturation temperature), compressed vapor condenses along the opposing plate surfaces 228 of the condensing chambers 232. The condensation of compressed vapor, moreover, causes heat to transfer across the plates 210, thereby evaporating liquid in the evaporating chambers 230. The condensate generated within the condensing chambers 232 is forced to the outboard ends of the condensing chambers 232 by the centrifugal forces generated in the rotating plate stack. Because the outboard ends of the condensing chambers 232 are sealed, the condensate forms annular pools, generally designated C, within each chamber 232. Given the high centrifugal forces generated by the rotating stack of plates 210, which is many times the force of gravity, the surfaces of these pools C is oriented perpendicular to the axis of rotation A—A. As additional compressed vapor condenses, the surfaces of these pools C reach the ports 306.

The condensate, which is constantly seeking out a lower level (relative to axis A—A), flows through the port 404 at the flange segment 212a of channel 212 and spills into the collection space 248. More specifically, the condensate flows through the condensate port 244 in the top plate 242. From collection space 248, condensate is removed by the second stationary scoop tube 250. More specifically, the build-up of condensate in the collection space 248 will eventually reach the scoop end 250a of the second stationary scoop tube 250, at which point condensate will be forced into the scoop tube 250 and removed from the evaporating and condensing unit 104. By constantly removing condensate from the collection space 248, a flow pattern of condensate is established from each condensing chamber 232 along the fluid flow path F and into the collection space 248. The condensate port 244, moreover, is preferably positioned outboard of ports 306 relative to axis A—A. In addition, the scoop end 250a of second stationary scoop tube 250 is preferably disposed within collection space 248 so that condensate port 244 remains full of condensate, but ports 306 remain only partially filled with condensate. Accordingly, compressed vapor flowing along passageway 402 from compressor 110 is blocked from flowing through condensate port 244 and into the collection space 248. Instead, the compressed vapor is forced to flow into port 404 and along fluid flow path F, thereby entering each condensing chamber 232. Flanges 308, which are joined at their distal ends 310, moreover, seal the fluid flow path F from the adjacent evaporating chambers 230. Because the compressed vapor in passageway 402 is at higher pressure than the vapor in outer space 254, the surface of condensate in collection space 248 will be "higher" relative to the axis of rotation than the surface of condensate at the outer end of passageway 402.

Those skilled in the art will recognize that other arrangements or structures may be provided to withdraw the condensate and allow compressed vapor to enter each condensing chamber 232. For example, compressed vapor may be distributed to the condensing chambers 232 through a cooperating set of vapor ports (not shown) in the heat exchange plates 210 that are independent of ports 306. These vapor ports, moreover, may be located at an inner diameter position relative to ports 306.

As shown, the configuration and assembly of plates 210 facilitates and protects the application of hydrophilic treatments to the plate surfaces 228 forming the evaporating chambers 230. In addition, the fluid flow patterns within the stack of plates 210 reduces the risk of contamination of the final condensate. More specifically, condensate is preferably drawn out of the unit 104 near the top opposite the sump 226, thereby reducing the chance that liquid from the sump 226 will contaminate the condensate. Additionally, any leaks in the condensing chambers 232 only result in condensate entering the housing 202 and falling down into the sump 226. In the preferred embodiment, a pressure differential of approximately 0.5 psi and a temperature differential of approximately 2° F. is established between the evaporating and condensing chambers 230, 232 during steady state operation of unit 104. This pressure differential, moreover, provides additional safeguards during generation of potable, distilled water. In particular, should a leak develop between any two adjacent chambers 230, 232, the pressure differential will cause condensate to enter the evaporating chamber 230 while preventing "dirty" liquid from entering the condensing chambers 232.

It should also be understood that the system 100 preferably includes one or more de-gasser components (not shown) for removing air and other gases from the system 100.

Multiple-effect System

Figure 5:
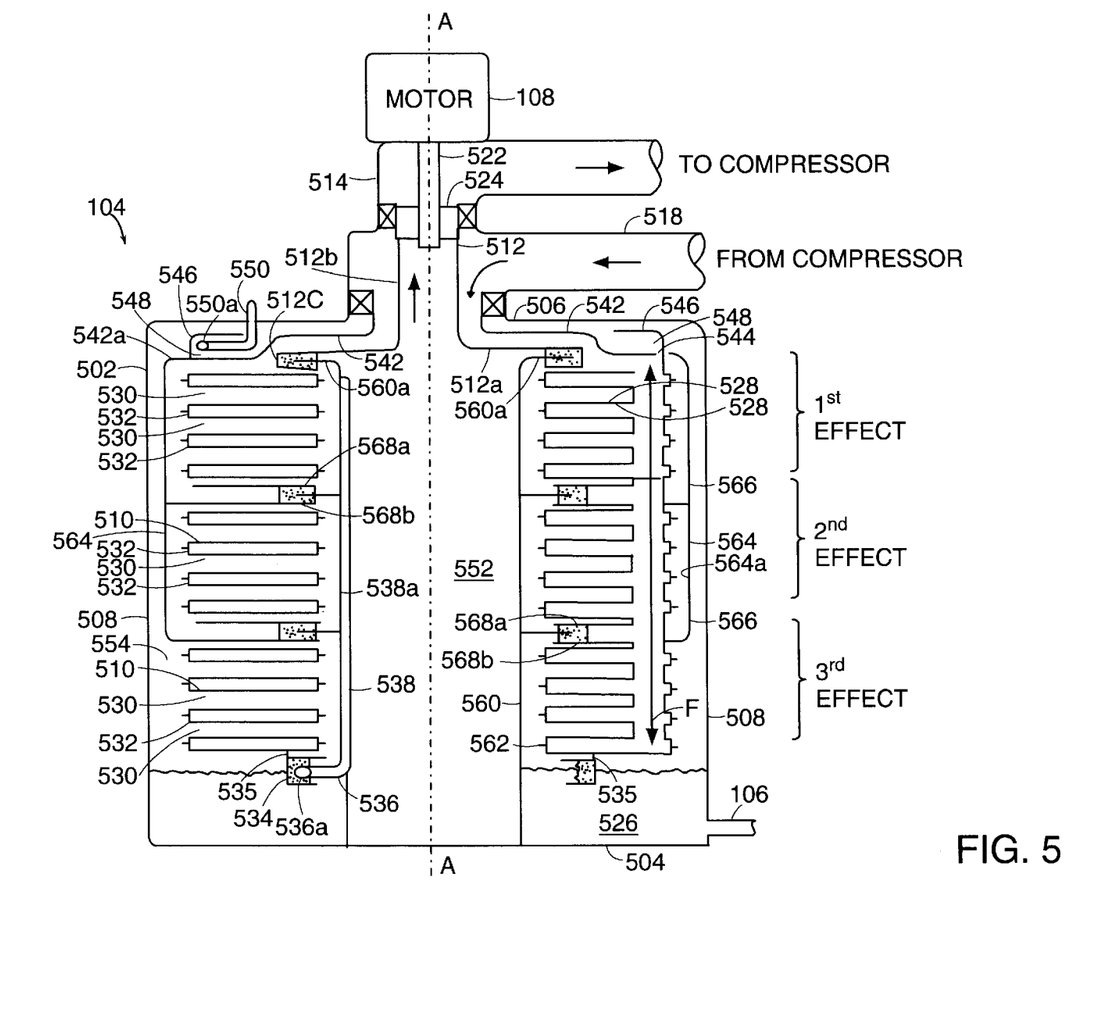
FIG. 5 is a cross-sectional plan view of a multiple-effect, rotary heat exchanger in accordance with the present invention.

FIG. 5 is a highly schematic, cross-sectional view the evaporation and condensation unit 104 of FIG. 1 configured as a multiple effect system. The unit 104 includes a housing 502 having a bottom wall 504, a top wall 506 and side walls 508. Disposed within the housing 502 are a plurality of horizontally stacked, spaced-apart heat-exchange plates 510 arranged in a plurality of effects (e.g., first, second and third effects). The plates 510 are also aligned for rotation about a common, central axis A—A. Mounted at the upper portion of the plate stack and extending through the top wall 506 of the housing 502 is a channel 512 having a flange segment 512a and a tube segment 512b. At the outer end of the flange segment 512a, relative to axis A—A, is a generally U-channel 512c. A vapor outlet tube 514 couples the tube segment 512b of the channel 512 to an inlet port of the compressor 110 (FIG. 1). A vapor inlet tube 518 connects the housing 502 preferably at its top wall 506 to an outlet port of the compressor 110. A shaft 522 from motor 108 extends through the outlet tube 514 and engages the channel 512 through a rotary drive adapter 524. The rotary drive adapter 524 permits fluid communication between the channel 512 and the outlet tube 514. A sump 526 which receives a liquid to be distilled from feed line 106 is located at the bottom of the housing 502.

Each plate 510 defines two surfaces 528, and the oppositely facing surfaces 528 of adjacent plates 510 define spaces therebetween. These spaces are alternately configured within each effect as evaporating chambers 530 and condensing chambers 532. Within each effect, plates 510 are substantially similar in design and configuration to heat-exchange plates 210 shown in FIGS. 3A and 3B. More specifically, each plate 510 includes both an inner diameter edge, an outer diameter edge, and at least one port proximate to outer diameter edge. The stacking arrangement of plates 510 within each effect establishes a generally vertical fluid flow path, F, along the ports that provides fluid communication between each condensing chamber 532, but by-passes the adjacent evaporation chambers 530. Additionally, both the inner and outer diameter edges of adjacent plates 510 forming each condensing chamber 532 are sealed, while both the inner and outer diameter edges of the evaporating chambers 530 are open.

Extending into sump 526 from the plate stack by a perforated support arm 535 is a rotating element 534 that preferably has a U-shape. A first stationary scoop tube 536 having a scoop end 536a is disposed in the sump 526 with its end 536a in the well defined by the U-shaped rotating element 534. The first stationary scoop tube 536 is coupled to a liquid feed pipe 538 which extends up through the stack of plates 510 adjacent to their inner diameter edges. Scoop tube 536 and/or feed pipe 538 is preferably mounted to the bottom wall 504 of housing 502. Running along the length of the feed pipe 538 is a slot 538a that faces the inner diameter edges of plates 510.

Mounted to the stack of plates 510 opposite the sump 526 is a top plate 542 having a condensate port 544 that is in fluid communication with the fluid flow path F through the condensing chambers 532. A flange 546 is preferably mounted to an outer edge 542a of top plate 542 opposite to the stack of plates 510 so as to define a collection space 548 between flange 546 and top plate 542 opposite the stack of plates 510. A second stationary scoop tube 550 having a scoop end 550a extends through the top wall 506 of housing 502 such that scoop end 550a is disposed in the collection space 548. The stack of plates 510 within housing 502 also defines a inner vapor collection space 552 inboard of the plates' inner diameter edges, and an outer vapor collection space 554 between the plates' outer diameter edges and side wall 508.

A cylindrical inner wall 560 is generally disposed inboard of the inner diameter edges of plates 510 (relative to axis of rotation A—A) and extends from the bottom wall 504 upwardly to channel 512. At its end opposite bottom wall 504, inner wall 560 includes a flange 560a that is disposed within the U-channel 512c of flange segment 512a. A plurality of holes or spaces, such as space 562, are formed in the inner wall 560 adjacent to the highest order (e.g., third) effect. Inner wall 560 essentially blocks evaporated vapor generated within the evaporating chambers 530 of all but the highest order effect from entering the inner vapor collection space 552. A cylindrical outer wall 564 is generally disposed outboard of the plates' outer diameter edges (relative to the axis of rotation A—A) and extends downward from the top wall 542 along all but the highest order (e.g., third) effect. The outer wall 564, which includes an inner surface 564a, essentially blocks vapor generated in the evaporating chambers 530 of all but the highest effect from entering the outer vapor collection space 554 of the housing 502, as described below. A plurality of apertures 566 are provided in the outer wall 564 at each effect.

It should be understood that, in an alternative embodiment, inner wall 560 may simply terminate before reaching the inner diameter end of the highest order effect. It should be further understood that other arrangements may be employed to block vapor from flowing between the evaporating chambers 530 of adjacent effects.

Between the plates 510 comprising each effect is at least one transition plate. That is, at least one transition plate is disposed between the first and second effect, between the second and third effect, and so on. As shown in FIG. 5, there are two transition plates 568a and 568b between each effect. As described below, the configuration of the transition plates 568a, 568b and walls 560 and 564 causes vapor generated in the evaporating chambers 530 of a given effect (e.g., the first effect) to flow to the condensing chambers 532 of the next higher order effect (e.g., the second effect). They also cause condensate generated in the condensing chambers 532 of each effect to flow along the fluid flow path F and into the collection space 548, where it may be withdrawn by the second stationary scoop tube 550.

Figure 6:
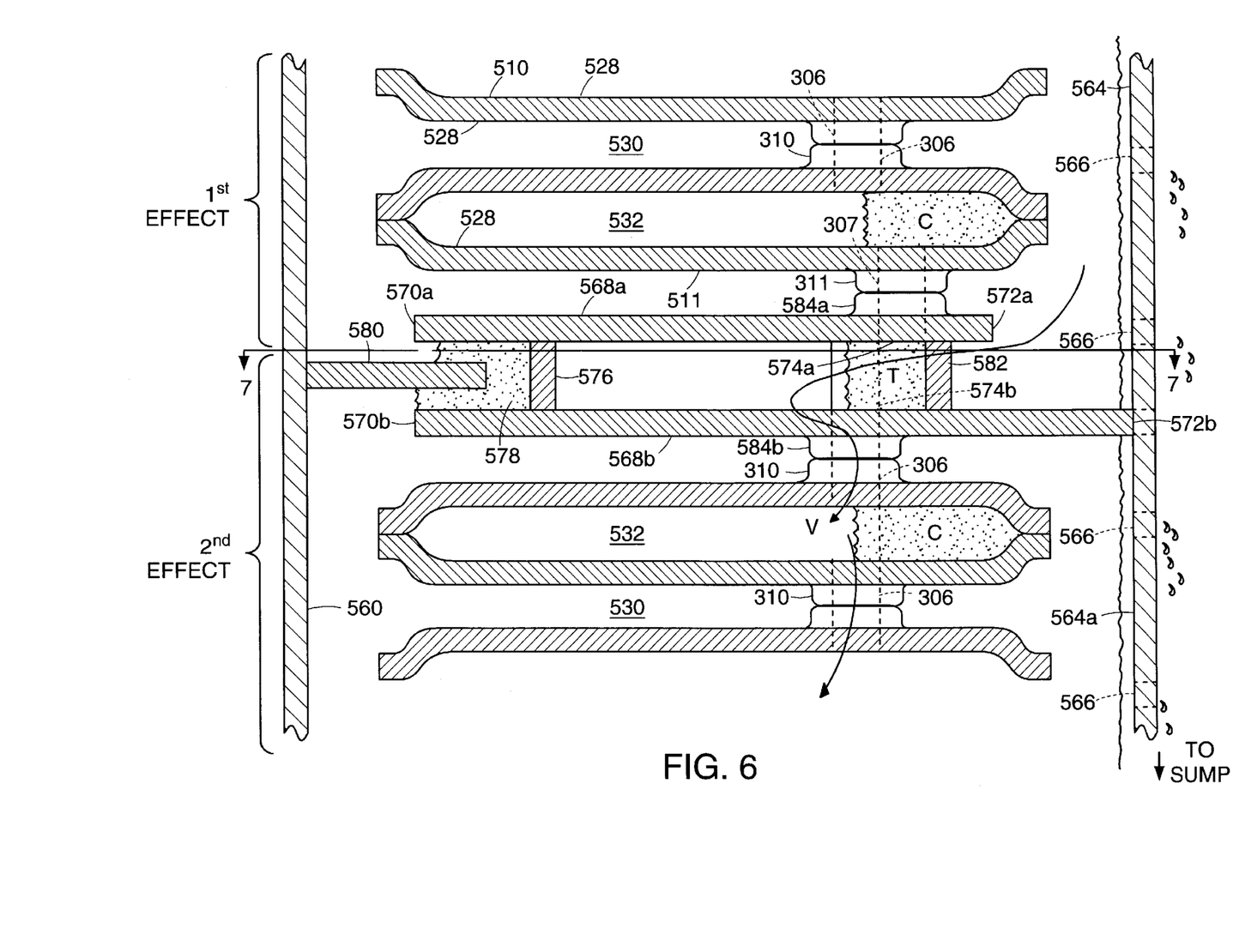
FIG. 6 is a cross-sectional plan view of the interface between two effects of the heat exchanger of FIG. 5.

FIG. 6 is a cross-sectional view of the interface between two effects (e.g., the first and second effects) of the multiple effect system. As shown, two transition plates 568a and 568b are disposed between the two effects. Each transition plate 568a, 568b has an inner diameter end 570a, 570b and an outer diameter end 572a, 572b and at least one fluid transition port 574a, 574b. The outer diameter end 572b of transition plate 568b, moreover, is affixed to the inner surface 564a of outer wall 564, while the outer diameter end 572a of transition plate 568a is spaced-apart from the outer wall 564. The fluid transition port 574b of transition plate 568b is both axially and radially aligned with the port 306 in the next adjacent plate 510. At the last heat exchange plate in the lower order (e.g., first) effect, which has been designated 511, the port, which has been designated 307, is axially off-set from the remaining ports 306 of the effect and from the ports 306 of the next higher order (e.g., second) effect. In particular, port 307 is at a greater radial position, relative to inner wall 560, than ports 306. The port 574a of transition plate 568a, moreover, is axially aligned with the off-set port 307 of the lowest plate 511.

Extending between the two transition plates 568a, 568b is a side wall 576 that is disposed proximate to the inner diameters ends 570a, 570b. Side wall 576 extends completely around the circumference of the stack of plates 510, and in combination with the two transition plates 568a, 568b defines a trough 578. Extending outwardly from the inner wall 560 in-between the two transition plates 568a, 568b is a shelf 580. The outer end of the shelf 580 is proximate to but spaced from side wall 576. The shelf 580 also extends completely around the circumference of the stack of plates 510. A C-shaped conduit 582 extends between the two transition plates 568a, 568b at each pair of corresponding ports 574a, 574b. Each C-shaped conduit 580, which does not extend around the circumference of the stack of plates 510, but is instead local to the adjoining ports 574a, 574b, is open in the direction of inner wall 560. Around each transition port 574a, 574b, opposite C-shaped conduit 580, is a transition port flange 584a, 584b. Transition port flange 584a sealingly engages a corresponding port flange 311 around port 307 of heat-exchange plate 511, while transition port flange 584b sealingly engages a corresponding port flange 310 at the next adjacent plate 510.

Figure 7:
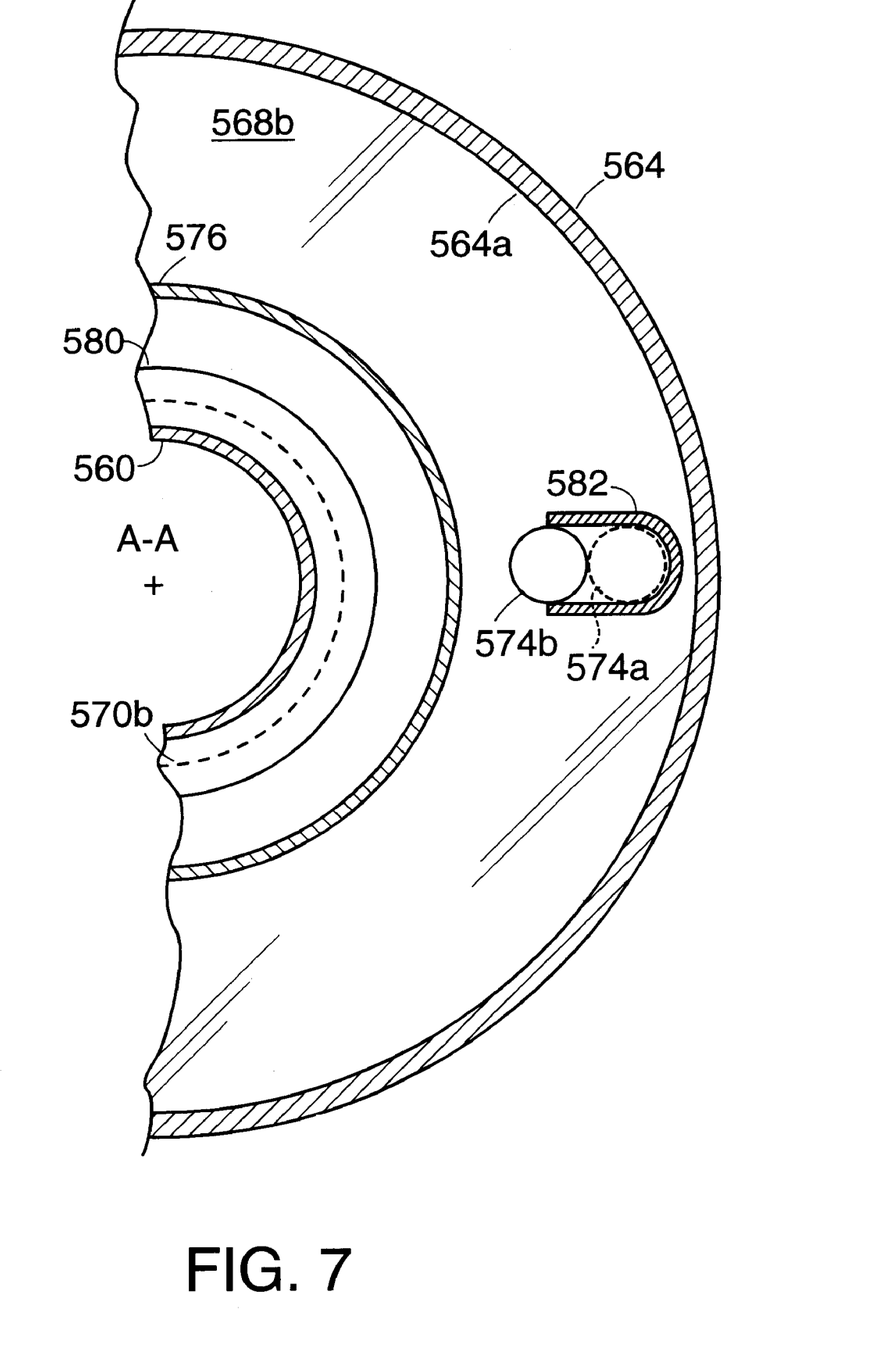
FIG. 7 is a bottom view of a transition plate of the multi-effect, rotary heat exchanger of FIG. 5.

FIG. 7 is a partial bottom view of the transition plate 568a along lines 7—7 of FIG. 6. As shown, the C-shaped conduit 582 only extends partially around the port 574a of transition plate 568a, and port 574a is slightly off-set radially from port 574b of transition plate 568b. In addition, both side wall 576 and shelf 580 extends completely around the circumference of the stack of plates 510.

With reference to FIGS. 1 and 5–7, in operation, motor 108 and compressor 110 are activated spinning the stack of plates 510 and drawing low pressure vapor from the housing 502 and returning higher pressure, higher temperature vapor to the condensing chambers 532 of the first effect, respectively. Rotating element 534 creates a rotating annular pool of feed liquid which is forced into the first stationary scoop tube 536 and pumped up the feed pipe 538, as described above. The liquid discharges from the slot 538a and impinges against the rotating stack of plates 510 of each effect, thereby delivering liquid to each evaporation chamber 530. Compressed vapor from compressor 110 is conveyed along the passageway formed between flange segment 512a and top wall 542 and enters the condensing chambers 532 of the first effect through ports 306. Condensate forms in the condensing chambers 532 transferring heat to the adjacent evaporating chambers 530. The transfer of the heat causes at least a portion of the liquid flowing along the plate surfaces 528 of the evaporating chambers 530 to evaporate. This vapor collects between the inner and outer walls, 560, 564, while the un-evaporated liquid is flung off of the plates 510 and forms an annular pool against the inner surface 564a of the outer wall 564. A stream of liquid will bleed out of this annular pool through the apertures 566 in the outer wall 564 and fall back down into the sump 526. The apertures 556 are preferably sized to permit an annular pool of liquid to remain inside of the outer wall 564, thereby blocking the vapor generated within the evaporating chambers 530 of the first effect from escaping through the apertures 566. Instead, the vapor flows downwardly to the transition plates 568a, 568b separating the first and second effects.

Liquid from feed pipe 538 forms a pool, L, in the trough 578 formed between the two transition plates 568a, 568b and side wall 576. As FIG. 6 shows, the surface of this pool in the lower order (e.g., first) effect is lower than the surface in the higher order (e.g., second) effect since the vapor pressure in the lower order effect is greater than in the higher order effect. The pool surface in the higher order effect, moreover, is generally defined by the inner diameter end 570b of transition plate 568b. Shelf 580 extends below the lowest pool surface within the trough 578. As mentioned above, the second transition plate 568b joins the outer wall 564. Accordingly, vapor generated from the evaporating chambers 530 of the first effect is prevented from flowing to the evaporating chambers 530 of the second effect by the fluid seal formed by the combination of liquid filled trough 578 and shelf 580 as well as the outer diameter end 572b of transition plate 568b being sealed against outer wall 564. Instead, vapor flows around the C-shaped conduits 582, through port 574b and into the condensing chambers 532 of the next higher order effect as shown by arrow V (FIG. 6). The vapor is distributed to each condensing chamber 532 of the next effect through ports 306. The surface levels of condensate in the higher order effects will generally be "higher" relative to the axis of rotation than the condensate surface levels in the lower order effects due to the lower vapor pressure in the higher order effects.

Within the first effect, compressed vapor condenses along the opposing plate surfaces 528 of the condensing chambers 532 and is forced to the outboard ends of the chambers 532 by centrifugal force. The condensate forms annular pools, generally designated C, at the outboard ends of chambers 532 which are sealed. Condensate flows upwardly relative to the sump 526 through the condensate ports 306 of plates 510 toward the collection space 548 as described above in connection with the single effect system. Again, the surface of condensate in collection space 548 will be "higher" relative to the axis of rotation due to the higher pressure of the compressed vapor. Annular pools of condensate are similarly formed in the condensing chambers 532 of the second effect. This condensate also flows upwardly toward the transition plates 568a, 568b. As best shown in FIGS. 6 and 7, condensate from the second effect spills out of the port 574b in transition plate 568b and, due to the centrifugal forces within the rotating plate stack, is caught in the C-shaped conduit 580 which surrounds the outer portion of the adjoining port 574a (FIG. 7) in the upper transition plate 568a. Condensate forms an annular pool, T, within the C-shaped conduit 580. From here, condensate flows through the transition port 574a in transition plate 568a and through port 307 in heat exchange plate 511, which are radially off-set (outwardly) from ports 306. As shown in FIG. 7, the well of the C-shaped conduit 582 preferably surrounds the outer portion of port 574a in transition plate 568a, while its side walls (only one of which is shown in FIG. 6) extend up alongside port 574b in transition plate 568b.

Preferably, the off-set port 574a in transition plate 568a (and its cooperating port 307 in the next adjacent plate 511) are configured to remain full of condensate during operation of the evaporation and condensation unit 104. That is, the surface of pool T is above (i.e., closer to the axis of rotation A—A than) the openings defined by transition port 574a and cooperating port 307. With port 574a at upper transition plate 568a full of condensate, compressed vapor in the condensing chambers 532 of the first effect is blocked from simply flowing through ports 307 and 574a and into the evaporating chambers 530 of the first effect. In addition, port 574b at lower transition plate 568b (and the cooperating ports 306 in heat exchange plates 510 of the second effect) are preferably not filled with condensate, thereby defining an open space above the surface of the condensate, which allows vapor to flow from evaporating chambers 530 of the lower order (e.g., first) effect to the condensing chambers 532 of the next higher order (e.g., second) effect.

Vapor generated within the evaporating chambers 530 of each effect is thus conveyed to the condensing chambers 532 of the next higher order effect. Similarly, the condensate at each effect is transported to the next lower order effect. At the highest order effect (e.g., the third effect), vapor enters the inner vapor collection space 552 through opening 562 in the inner wall 560. This vapor is then drawn upwardly through channel 512, through vapor outlet tube 514 and into the compressor 110. Any un-evaporated liquid in the highest order effect is flung off of the rotating plates 510, strikes the side wall 508 and falls back down to the sump 526. At the first effect, condensate from each of the effects flows through condensate port 544 in top wall 542 and accumulates in the collection space 548 where it is removed by the second stationary scoop tube 550. As described above in connection with the single effect system, condensate port 544 is configured to be below the surface of the annular condensate pool in the collection space 548 so that compressed vapor is blocked from flowing through condensate port 544 and into the housing 502.

It should be understood that feed pipe 538 should be configured to remain full of feed liquid during operation of the heat exchanger so as to block vapor from flowing between effects through the feed pipe 538.

Figure 8:
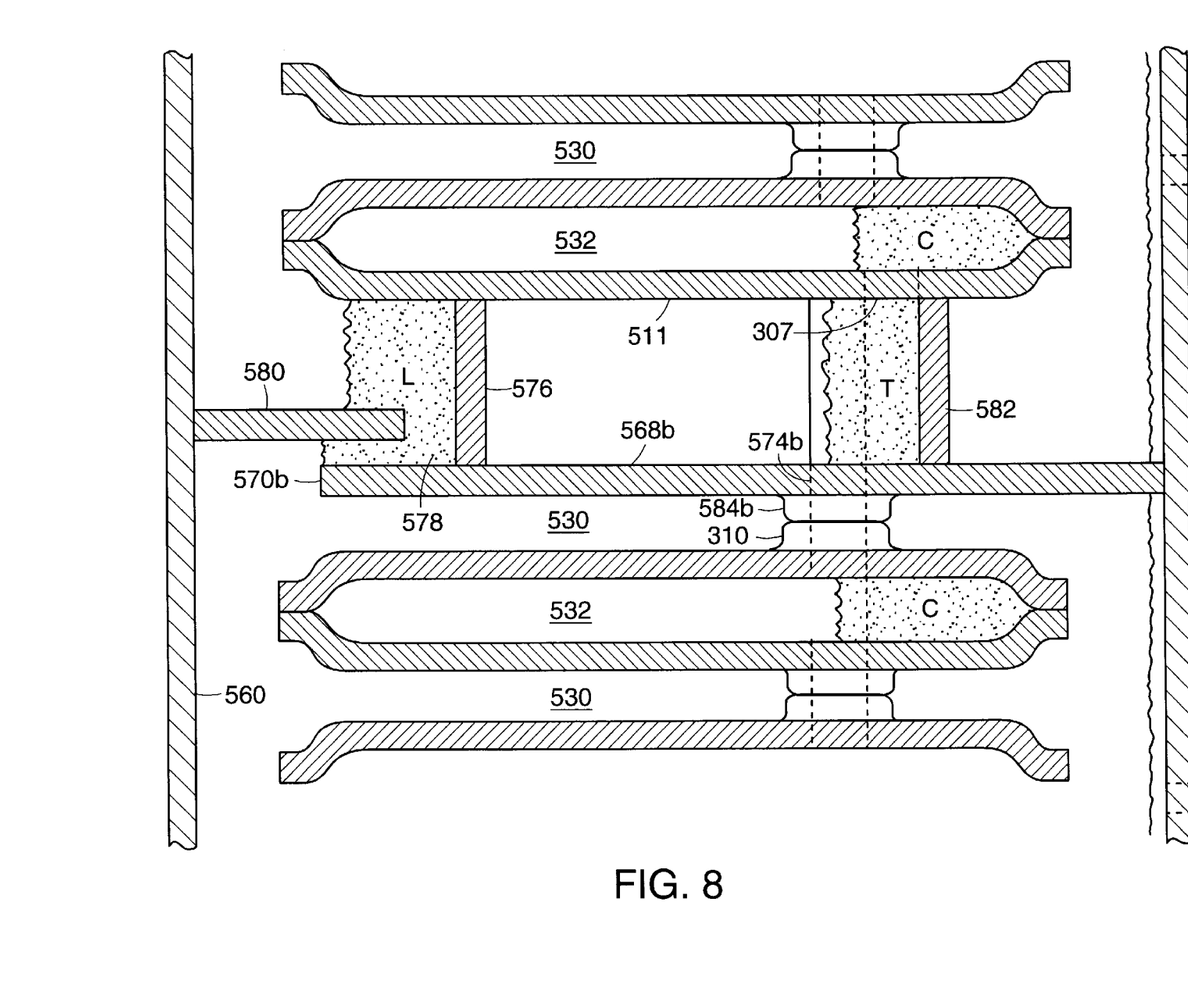
FIG. 8 is a cross-sectional plan view of an alternative interface between two effects of the heat exchanger of FIG. 5.

FIG. 8 is a partial side view of an alternative transition between two effects of the multiple effect heat exchanger of FIG. 5. In this embodiment, there is a single transition plate 568b. The side wall 576 and C-shaped conduit 582, moreover, extend from the single transition plate 568b directly to the first heat exchange plate 511 of the next lower order (e.g., first) effect. Operation of the alternative embodiment of FIG. 8 is similar to the operation described above. In particular, liquid from the sump 526 fills the trough 578 defined by the side wall 576, transition plate 568b and heat exchange plate 511. Shelf 580 extends below the surface of liquid L in the trough 578, thereby blocking vapor generated within the lower order effect from simply flowing to the evaporating chambers 530 of the next higher order effect. Furthermore, the C-shaped conduit 582 is open toward the inner wall 560, allowing the vapor to flow to the condensing chambers 532 of the next higher order effect and conveying condensate from each effect upwardly for removal by the second stationary scoop tube 550. The port 307 in the heat exchange plate 511 adjacent to the transition plate 568b is axially off-set from remaining ports 306 of the effect and also the port 574b in the transition plate 568b. This port 307, moreover, is configured to remain full of condensate, thereby blocking compressed vapor in the condensing chambers 532 of the lower order effect from flowing to the evaporating chambers 530 of that effect. Additionally, an open space is provided in the port 574b of transition plate 568b and in the ports 306 of the next higher order effect so that vapor from the evaporating chambers 530 of the lower order effect may flow to the condensing chambers 532 of the next higher order effect.

Those skilled in the art will recognize that other structural arrangements can be made to achieve the desired flow of vapor and condensate between the effects. For example, the inner diameter end 570b of transition plate 568b could be sealed against inner wall 560, thereby eliminating the need for shelf 580.

Figure 9A:
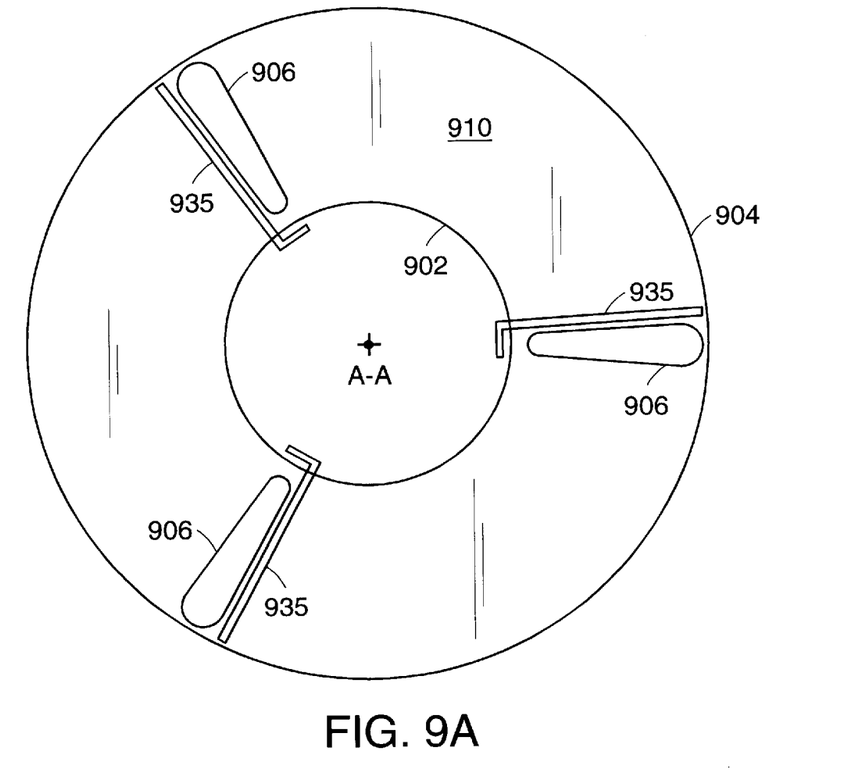
FIGS. 9A and 9B are top and side views of an alternative heat-exchange plate.
Figure 9B:
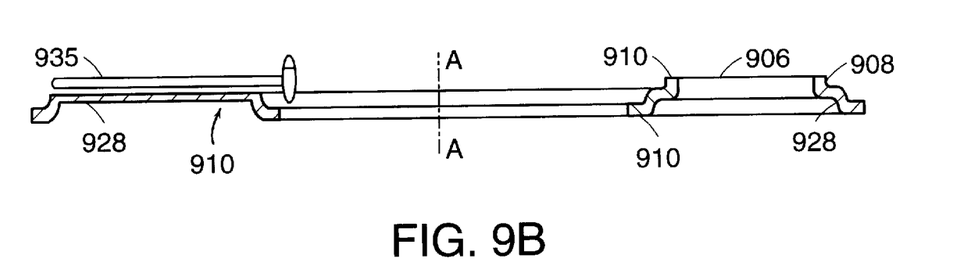

Those skilled in the art will also recognize that other heat-exchange plate designs may be utilized with the present invention. FIGS. 9A and 9B are top and side views, respectively, of an alternative heat-exchange plate 910. Plate 910 includes an inner edge 902 and an outer edge 904 relative to axis of rotation A—A and one or more ports 906 for distributing compressed vapor and extracting a condensate, as described above. In the preferred embodiment, each plate 910 includes three ports 906 that are each elongated so as to extend generally from the inner edge 902 to the outer edge 904 of the plate 910. The elongated configuration of ports 906 defines a larger open space for distributing compressed vapor among the constituent condensing chambers of the plate stack. Extending from one plate surface 928 of plate 910 is a port flange 908 that surrounds the corresponding port 906. Each port flange 908 includes a distal surface 910, which is sealingly joined to the distal surface of the adjacent port flange, as described above.

To remove scale that may build up on the plate surfaces 928 forming the constituent evaporating chambers, one or more wipers 935 may be mounted in the evaporating chambers. The wipers 935, which may be formed from plastic or metal, extend along the plate surfaces 928 and rotate with plates 910 during operation of the heat exchanger. After distilling a volume of liquid, the plate stack is stopped and the wipers 935 are engaged. In response, the wipers 935 oscillate back and forth across the plate surfaces 928, scraping off any scale that may have formed. The oscillating range of the wipers 935 is preferably restricted to prevent damaging the flanges 908 which extend above the plate surfaces 928 in the evaporating chambers. Conventional motors, gears and stops may be utilized to provide the desired oscillating action of wipers 935.

The foregoing description has been directed to specific embodiments of this invention. It will be apparent, however, that other variations and modifications may be made to the described embodiments, with the attainment of some or all of their advantages. For example, the evaporation and condensation unit 104 may alternatively be thermally driven. More specifically, liquid in the sump may be heated to the desired temperature by sources other than heat exchanger 102, such as a stove top burner, solar energy, etc. Therefore, it is the object of the appended claims to cover all such variations and modifications as come within the true spirit and scope of the invention.

What is claimed is:

1. An evaporator-and-condenser unit for use in a vapor compression distiller comprising:
   A. a motor;
   B. a compressor having a compressor inlet and a compressor outlet;
   C. a heat exchanger coupled to the motor for rotation thereby about an axis of rotation and comprising:
      1. a plate stack including a plurality of spaced-apart, annular heat-exchange plates, each heat-exchange plate having a center point and an axis that passes through the plate's center point and extends perpendicular to a nominal plane of the plate, the axes of the plates coaxially aligned with the axis of rotation, each annular heat-exchange plate having two plate surfaces and inner and outer edges with respect to the center point, the heat-exchange plates defining alternating evaporating and condensing chambers between their opposing plate surfaces such that the plate surfaces between which the condensing chambers are formed define a generally closed interior condensation space in fluid communication with the compressor outlet, wherein:
         a) each pair of heat-exchange plates that defines a condensing chamber is sealed at those heat-exchange plates' inner and outer edges; and
         b) each pair of heat-exchange plates that defines an evaporating chamber is open at those heat-exchange plates' inner and outer edges and cooperates to form a fluid passage isolated from the evaporating chamber that they define but cooperating with the condensing chambers and the fluid passages formed by adjacent heat-exchange plate pairs to form a fluid flow path, at least a portion of which is near the heat-exchange plates' outer edges, by which condensate can be withdrawn from the condensing chambers; and
      2. a feed-liquid source that supplies feed liquid to the evaporating chambers; and
   D. a side wall disposed about the heat exchanger and forming with the plate surfaces between which the evaporating chambers are defined an evaporator space in fluid communication with the compressor inlet.

2. The evaporator-and-condenser unit of claim 1 further wherein the condensing chambers and fluid passages also cooperate to distribute compressed vapor to the constituent condensing chambers along the fluid flow path.

3. The evaporator-and-condenser unit of claim 2 wherein the feed-liquid source comprises:
   a sump containing the feed liquid being distilled; and
   a feed pipe extending along the inner edges of the heat-exchange plates; and
   a pump disposed in the sump and coupled to the feed pipe for forcing feed liquid along the feed pipe.

4. The evaporator and condenser unit of claim 3 wherein the pump comprises:
   a rotating element extending at least partially into the sump; and
   a first stationary scoop tube having an end disposed within the sump and positioned proximate to the rotating element, wherein the feed pipe is coupled to the scoop tube and includes one or more slots facing the adjacent inner edges of the heat-exchange plates.

5. The evaporator and condenser unit of claim 2 wherein the inner edges of the heat-exchange plates further define an inner vapor collection space in fluid communication with the evaporating chambers and coupled to the compressor inlet.

6. The evaporator and condenser unit of claim 3 wherein the heat exchanger further comprises:
   a top plate joined to the plate stack opposite the sump, the top plate including a flange defining a condensate collection space that is in fluid communication with the fluid flow path; and
   a second stationary scoop tube having an end disposed in the condensate collection space, the second stationary scoop tube being arranged to withdraw condensate from the condensate collection space.

7. The evaporator and condenser unit of claim 6 wherein the top plate includes a port that cooperates with the fluid flow path to permit condensate flow from the condensate feed passages to the condensate collection space, but block the flow of compressed vapor from the outlet of the compressor to the condensate collection space.

8. The evaporator and condenser unit of claim 2 wherein each heat-exchange plate includes at least one port proximate to its outer edge, the condensate ports of the plate stack cooperate to form the fluid passage through the evaporating chambers.

9. The evaporator and condenser unit of claim 8 wherein each heat-exchange plate includes a port flange around its at least one port, each port flange having a distal end such that the distal ends of opposing port flanges of a given evaporating chamber are joined in sealing engagement.

10. A heat exchanger for use in a distiller having a compressor, a side wall disposed about the heat exchanger, and a motor coupled to the heat exchanger for rotation thereby about an axis of rotation, the compressor including a compressor inlet and a compressor outlet, the heat exchanger comprising:

A. a plate stack including a plurality of spaced-apart, annular heat-exchange plates, each heat-exchange plate having a center point and an axis that passes through the plate's center point and extends perpendicular to a nominal plane of the plate, the axes of the plates coaxially aligned with the axis of rotation, each annular heat-exchange plate having two plate surfaces and inner and outer edges with respect to the center point, the heat-exchange plates defining alternating evaporating and condensing chambers between their opposing plate surfaces such that the plate surfaces between which the condensing chambers are formed define a generally closed interior condensation space in fluid communication with the compressor outlet, wherein:
      1. each pair of heat-exchange plates that defines a condensing chamber is sealed at those heat-exchange plates' inner and outer edges; and
      2. each pair of heat-exchange plates that defines an evaporating chamber is open at those heat-exchange plates' inner and outer edges and cooperates to form a fluid passage isolated from the evaporating chamber that they define but cooperating with the condensing chambers and the fluid passages formed by adjacent heat-exchange plate pairs to form a fluid flow path, at least a portion of which is near the heat-exchange plates' outer edges, by which condensate can be withdrawn from the condensing chambers; and
   B. a feed-liquid source that supplies feed liquid to the evaporating chambers; and further wherein the side wall cooperates with the plate surfaces between which the evaporating chambers are defined to form an evaporator space in fluid communication with the compressor inlet.

11. The heat exchanger of claim 10 further wherein the condensing chambers and fluid passages also cooperate to distribute compressed vapor to the constituent condensing chambers along the fluid flow path.

12. The heat exchanger of claim 11 wherein the feed-liquid source comprises:

a sump containing the feed liquid being distilled; and
   a feed pipe extending along the inner edges of the heat-exchange plates; and
   a pump disposed in the sump and coupled to the feed pipe for forcing feed liquid along the feed pipe.

13. The heat exchanger of claim 12 wherein the pump comprises:

a rotating element extending at least partially into the sump; and
   a first stationary scoop tube having an end disposed within the sump and positioned proximate to the rotating element, wherein the feed pipe is coupled to the scoop tube and includes one or more slots facing the adjacent inner edges of the heat-exchange plates.

14. The heat exchanger of claim 11 wherein the inner edges of the heat-exchange plates further define an inner vapor collection space in fluid communication with the evaporating chambers and coupled to the compressor inlet.

15. The heat exchanger of claim 12 wherein the heat exchanger further comprises:

a top plate joined to the plate stack opposite the sump, the top plate including a flange defining a condensate collection space that is in fluid communication with the fluid flow path; and
   a second stationary scoop tube having an end disposed in the condensate collection space, the second stationary scoop tube being arranged to withdraw condensate from the condensate collection space.

16. The heat exchanger of claim 15 wherein the top plate includes a port that cooperates with the fluid flow path to permit condensate flow from the condensate feed passages to the condensate collection space, but block the flow of compressed vapor from the outlet of the compressor to the condensate collection space.

17. The heat exchanger of claim 11 wherein each heat-exchange plate includes at least one port, at least a portion of which is proximate to its outer edge, the ports of the plate stack cooperate to form the fluid passage through the evaporating chambers.

18. The heat exchanger of claim 17 wherein each heat-exchange plate includes a port flange around its at least one port in the respective condensing chamber, each port flange having a distal end such that the distal ends of opposing port flanges of a given evaporating chamber are joined in sealing engagement.

19. A multiple-effect heat exchanger for use in a distiller having a compressor, a side wall disposed about the heat exchanger, and a motor coupled to the heat exchanger for rotation thereby about an axis of rotation, the compressor including a compressor inlet and a compressor outlet, the heat exchanger comprising:

a plurality of effects, including a first and a last effect, each effect comprising:
      a plate stack including a plurality of spaced-apart, annular heat-exchange plates, each heat-exchange plate having a center point and an axis that passes through the plate's center point and extends perpendicular to a nominal plane of the plate, the axes of the plates coaxially aligned with the common axis of rotation, each annular heat-exchange plate having two plate surfaces and inner and outer edges with respect to the center point, the heat-exchange plates defining alternating evaporating and condensing chambers between their opposing plate surfaces such that the plate surfaces between which the condensing chambers are formed define a generally closed interior condensation space in fluid communication with the compressor outlet;
   an inner wall disposed inboard of the heat-exchange plates' inner edges relative to the axis of rotation and extending along all but the last effect;

an outer wall disposed between the plates' outer edges and the side wall and extending along all but the last effect;

a feed pipe extending along the inner edges of the heat-exchange plates for delivering a feed liquid to be distilled to the evaporating chambers; and at least one transition plate disposed between each pair of adjacent effects, the pair of adjacent effects including a higher order effect and a lower order effect, each transition plate including inner and outer edges, wherein 1. each pair of heat-exchange plates that defines a condensing chamber is sealed at those heat-exchange plates' inner and outer edges;
2. each pair of heat-exchange plates that defines an evaporating chamber is open at those heat-exchange plates' inner and outer edges and cooperates to form a fluid passage isolated from the evaporating chamber that they define but cooperating with the condensing chambers and the fluid passages formed by adjacent heat-exchange plate pairs to form a fluid flow path, at least a portion of which is near the heat-exchange plates' outer edges, by which condensate can be withdrawn from the condensing chambers;
3. each transition plate cooperates with the inner and outer walls to define a vapor seal at the transition plate's inner and outer edges, the vapor seals blocking the flow of vapor between the evaporating chambers of adjacent effects;
4. each transition plate cooperates with the fluid passages of the evaporating chambers of the adjacent effects to distribute vapor from the evaporating chambers of the lower order effect to the condensing chambers of the higher order effect; and
5. the side wall forming with the plate surfaces between which the evaporating chambers are defined at the last effect an evaporator space in fluid communication with the compressor inlet.

20. The multiple-effect heat exchanger of claim 19 further wherein the condensing chambers and fluid passages also cooperate to distribute compressed vapor to the constituent condensing chambers along the fluid flow path.

21. The multiple-effect heat exchanger of claim 20 further comprising a sump containing the liquid feed being distilled and further wherein the outer wall has a plurality of apertures providing fluid communication between the evaporating chambers and the sump.

22. The multiple-effect heat exchanger of claim 21 wherein the outer wall has an inner surface relative to outer edges of the heat-exchange plates and further wherein the plurality of apertures are sized so as to cause an annular pool of feed liquid to form on the inner surface of the outer wall, the annular pool presenting a vapor barrier to the flow of vapor through the plurality of apertures.

23. The multiple-effect heat exchanger of claim 20 having first and second transition plates between adjacent effects, wherein a side wall extends circumferentially relative to the plate stack between the first and second transition plates proximate to their inner edges, thereby defining a trough;

a shelf extends circumferentially from the inner wall into the trough defined by the first and second transition plates and the side wall; and at least one of the first and second transition plates at its outer edge sealingly joins the outer wall.

24. The multiple-effect heat exchanger of claim 23 wherein the first and second transition plates each include at least one port, having at least a portion that is proximate to their outer edges, the multiple-effect heat exchanger further comprising a conduit extending between the first and second transition plates around at least one ports, the conduit open in the direction of the axis of rotation.

25. The multiple-effect heat exchanger of claim 23 wherein the at least one port of the first transition plate is radially off-set from the at least one port in the second transition plate.

26. The multiple-effect heat exchanger of claim 20 wherein each transition plate further cooperates with the fluid passages of the evaporating chambers of the adjacent effects to distribute condensate from the condensing chambers of the higher order effect to the condensing chambers of the lower order effect.

* * * * *